US012794953B2

(12) United States Patent
Hoffmann

(10) Patent No.: US 12,794,953 B2
(45) Date of Patent: Nov. 10, 2026

(54) METHOD, APPARATUS AND COMPUTER PROGRAM

(71) Applicant: Nokia Technologies Oy, Espoo (FI)

(72) Inventor: Klaus Hoffmann, Munich (DE)

(73) Assignee: Nokia Technologies Oy, Espoo (FI)

( * ) Notice: Subject to any disclaimer, the term of this patent is extended or adjusted under 35 U.S.C. 154(b) by 154 days.

(21) Appl. No.: 18/714,003

(22) PCT Filed: Nov. 29, 2021

(86) PCT No.: PCT/EP2021/083365

§ 371 (c)(1),
(2) Date: May 28, 2024

(87) PCT Pub. No.: WO2023/094009

PCT Pub. Date: Jun. 1, 2023

(65) Prior Publication Data

US 2025/0039247 A1 Jan. 30, 2025

(51) Int. Cl.
*H04L 65/1016* (2022.01)
*H04L 65/1045* (2022.01)
*H04L 65/80* (2022.01)

(52) U.S. Cl.
CPC ...... *H04L 65/1016* (2013.01); *H04L 65/1045* (2022.05); *H04L 65/80* (2013.01)

(58) Field of Classification Search
CPC .. H04L 65/1016; H04L 65/1045; H04L 65/80
See application file for complete search history.

(56) References Cited

U.S. PATENT DOCUMENTS

2007/0207805 A1* 9/2007 Pallares Lopez . H04W 36/0033 455/436
2019/0357301 A1 11/2019 Li et al.
2019/0364420 A1* 11/2019 Rommer ............. H04W 12/033
2020/0413246 A1 12/2020 Qiao et al.
2021/0152613 A1* 5/2021 Saghir ................... H04W 76/12
2021/0152614 A1* 5/2021 Sun ...................... H04L 65/1063
2021/0392540 A1* 12/2021 Chong .............. H04W 28/0268
(Continued)

FOREIGN PATENT DOCUMENTS

CN 109274512 A 1/2019
WO 2020/013739 A1 1/2020
(Continued)

OTHER PUBLICATIONS

Triwijitkasem et al., Gateway selection interconnecting a mobile data network to a fixed data network, Proceedings of ICICS, 1997 International Conference on Information, Communications and Signal Processing. (Year: 1997).*
(Continued)

*Primary Examiner* — Oanh Duong
(74) *Attorney, Agent, or Firm* — Lippes Mathias LLP

(57) ABSTRACT

There is provided an apparatus configured to: obtain, from a network repository function, profile information for one or more gateway network functions; select one of the one or more gateway network functions for delivering media to a user equipment based on the profile information; and establish a media session to deliver the media to the user equipment via the selected gateway network function.

20 Claims, 11 Drawing Sheets

(56) References Cited

U.S. PATENT DOCUMENTS

| | | | | |
|---|---|---|---|---|
| 2022/0247798 A1* | 8/2022 | Guo | .................... | H04L 65/1069 |
| 2023/0354166 A1* | 11/2023 | Deng | .................... | H04W 12/06 |

FOREIGN PATENT DOCUMENTS

| | | |
|---|---|---|
| WO | 2020/025028 A1 | 2/2020 |
| WO | 2021/028435 A1 | 2/2021 |
| WO | 2021/064445 A1 | 4/2021 |

OTHER PUBLICATIONS

"New SID: Study on system architecture for next generation real time communication services", SA WG2 Meeting #146e, S2-2106222, Agenda: 9.1, China Mobile, Aug. 16-27, 2021, 4 pages.
"3rd Generation Partnership Project; Technical Specification Group Services and System Aspects; IP Multimedia Subsystem (IMS); Stage 2 (Release 17)", 3GPP TS 23.228, V17.1.0, Jun. 2021, pp. 1-353.
"3rd Generation Partnership Project; Technical Specification Group Services and System Aspects; Study on enhanced IP Multimedia Subsystem (IMS) to 5GC integration (Release 17)", 3GPP TR 23.794, V17.0.0, Dec. 2019, pp. 1-83.
"3rd Generation Partnership Project; Technical Specification Group Services and System Aspects; System architecture for the 5G System (5GS); Stage 2 (Release 17)", 3GPP TS 23.501, V17.1.1, Jun. 2021, pp. 1-526.
"3rd Generation Partnership Project; Technical Specification Group Services and System Aspects; Procedures for the 5G System (5GS); Stage 2 (Release 17)", 3GPP TS 23.502, V17.1.0, Jun. 2021, pp. 1-692.
Wu, "Efficient P-CSCF Discovery through NASS-IMS", 2nd International Conference on Education Technology and Computer, Jun. 22-24, 2010, pp. 201-205.
"3rd Generation Partnership Project; Technical Specification Group Services and System Aspects; Network architecture (Release 17)", 3GPP TS 23.002, V17.0.0, Mar. 2021, pp. 1-114.
"3rd Generation Partnership Project, Technical Specification Group Services and System Aspects; General Packet Radio Service (GPRS) enhancements for Evolved Universal Terrestrial Radio Access Network (E-UTRAN) access (Release 17)", 3GPP TS 23.401, V17.2.0, Sep. 2021, pp. 1-447.
"3rd Generation Partnership Project; Technical Specification Group Services and System Aspects; Policy and charging control architecture (Release 17)", 3GPP TS 23.203, V17.1.0, Jun. 2021, pp. 1-267.
"3rd Generation Partnership Project; Technical Specification Group Services and System Aspects; Policy and charging control framework for the 5G System (5GS); Stage 2 (Release 17)", 3GPP TS 23.503, V17.2.0, Sep. 2021, pp. 1-141.
Invitation to Pay Additional Fees received for corresponding Patent Cooperation Treaty Application No. PCT/EP2021/083365, dated Aug. 23, 2022, 12 pages.
International Search Report and Written Opinion received for corresponding Patent Cooperation Treaty Application No. PCT/EP2021/083365, dated Sep. 23, 2022, 18 pages.

* cited by examiner

METHOD, APPARATUS AND COMPUTER PROGRAM

RELATED APPLICATION

This application claims priority to PCT Patent Application No. PCT/EP2021/083365, filed 29 Nov. 2021, which is incorporated herein by reference in its entirety.

FIELD

The present application relates to a method, apparatus, and computer program and in particular but not exclusively to selecting a gateway network function for delivering media to a user equipment.

BACKGROUND

A communication system can be seen as a facility that enables communication sessions between two or more entities such as user terminals, base stations and/or other nodes by providing carriers between the various entities involved in the communications path. A communication system can be provided for example by means of a communication network and one or more compatible communication devices. The communication sessions may comprise, for example, communication of data for carrying communications such as voice, video, electronic mail (email), text message, multimedia and/or content data and so on. Non-limiting examples of services provided comprise two-way or multi-way calls, data communication or multimedia services and access to a data network system, such as the Internet.

In a wireless communication system at least a part of a communication session between at least two stations occurs over a wireless link. Examples of wireless systems comprise public land mobile networks (PLMN), satellite based communication systems and different wireless local networks, for example wireless local area networks (WLAN). Some wireless systems can be divided into cells, and are therefore often referred to as cellular systems.

A user can access the communication system by means of an appropriate communication device or terminal. A communication device of a user may be referred to as user equipment (UE) or user device. A communication device is provided with an appropriate signal receiving and transmitting apparatus for enabling communications, for example enabling access to a communication network or communications directly with other users. The communication device may access a carrier provided by a station, for example a base station of a cell, and transmit and/or receive communications on the carrier.

The communication system and associated devices typically operate in accordance with a given standard or specification which sets out what the various entities associated with the system are permitted to do and how that should be achieved. Communication protocols and/or parameters which shall be used for the connection are also typically defined. One example of a communications system is UTRAN (3G radio). Other examples of communication systems are the long-term evolution (LTE) of the Universal Mobile Telecommunications System (UMTS) radio-access technology and so-called 5G or New Radio (NR) networks. NR is being standardized by the 3rd Generation Partnership Project (3GPP).

SUMMARY

According to an aspect, there is provided an apparatus comprising means for: obtaining, from a network repository function, profile information for one or more gateway network functions; selecting one of the one or more gateway network functions for delivering media to a user equipment based on the profile information; and establishing a media session to deliver the media to the user equipment via the selected gateway network function.

The profile information may comprise at least one of: information identifying the one or more gateway network functions; a delay between the one or more gateway network functions and at least one user plane function; and address information for the one or more gateway network functions.

The selecting may comprise: selecting the one of the one or more gateway network functions in response to determining that the delay between the one of the one or more gateway network functions and at least one user plane function meets a quality-of-service requirement.

The means may be for: sending, to the network repository function, a request to store the profile information for one or more gateway network functions with which the apparatus can communicate.

The obtaining may comprise: sending, to the network repository function, a discovery request for discovering the one or more gateway network functions; and receiving, from the network repository function and based on the discovery request, a response comprising the profile information for the one or more gateway network functions.

The means may be for: receiving, from a session management function and/or a network exposure function, information identifying at least one of: the user equipment; a data network access identifier of the user equipment; an internet protocol address of a user plane function; and one or more traffic routing requirements, wherein the discovery request comprises the received information.

The means may be for: associating the media session with a packet data unit session based on the information identifying the user equipment.

The routing requirements may identify at least one user plane function for delivering the media session.

The means may be for: receiving, from the user equipment, a media session invitation, wherein the obtaining is performed responsive to receiving the media session invitation.

The means may be for: storing the obtained profile information at the apparatus.

The means may be for: sending, to the network repository function, a subscription request for the profile information for the one or more gateway network functions; and receiving, from the network repository function, a subscription notification comprising updated profile information for the one or more gateway network functions.

The gateway network functions may comprise: an internet protocol multimedia subsystem application gateway; or a transition gateway.

According to an aspect, there is provided an apparatus comprising means for: storing profile information for one or more gateway network functions; and providing, to a first network function, the profile information for the one or more gateway network functions.

The profile information may comprise at least one of: information identifying the one or more gateway network functions; a delay between the one or more gateway network functions and at least one user plane function; and address information for the one or more gateway network functions.

The means may be for: receiving a request to store the profile information for one or more gateway network functions with which the first network function can communicate, wherein the storing is performed based on the request.

The means may be for: receiving, from the first network function, a discovery request for discovering the one or more gateway network functions; and sending, to the first network function and based on the discovery request, a response comprising the profile information for the one or more gateway network functions.

The discovery request may comprise information identifying at least one of: the user equipment; a data network access identifier of the user equipment; an internet protocol address of a user plane function; and one or more traffic routing requirements.

The routing requirements may identify at least one user plane function for delivering a media session to a user equipment.

The means may be for: receiving, from the first network function, a subscription request for the profile information for the one or more gateway network functions; determining updated profile information for the one or more gateway network functions; and sending, to the first network function, a subscription notification comprising the updated profile information for the one or more gateway network functions.

The first network function may comprise a call service control function, and the gateway network function may comprise an internet protocol multimedia subsystem application gateway; or the first network function may comprise an interconnection border control function, and the gateway network function may comprise a transition gateway.

According to an aspect, there is provided an apparatus comprising means for: sending, to a network repository function, a request to store profile information for one or more gateway network functions.

The apparatus may comprise one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided an apparatus comprising means for: receiving, from a second network function, a request to store profile information for one or more gateway network functions; and storing the profile information.

The second network function may comprise one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided an apparatus comprising at least one processor and at least one memory including a computer program code, the at least one memory and computer program code configured to, with the at least one processor, cause the apparatus at least to: obtain, from a network repository function, profile information for one or more gateway network functions; select one of the one or more gateway network functions for delivering media to a user equipment based on the profile information; and establish a media session to deliver the media to the user equipment via the selected gateway network function.

The profile information may comprise at least one of: information identifying the one or more gateway network functions; a delay between the one or more gateway network functions and at least one user plane function; and address information for the one or more gateway network functions.

The at least one memory and at least one processor may be configured to cause the apparatus to: select the one of the one or more gateway network functions in response to determining that the delay between the one of the one or more gateway network functions and at least one user plane function meets a quality-of-service requirement.

The at least one memory and at least one processor may be configured to cause the apparatus to: send, to the network repository function, a request to store the profile information for one or more gateway network functions with which the apparatus can communicate.

The at least one memory and at least one processor may be configured to cause the apparatus to: send, to the network repository function, a discovery request for discovering the one or more gateway network functions; and receive, from the network repository function and based on the discovery request, a response comprising the profile information for the one or more gateway network functions.

The at least one memory and at least one processor may be configured to cause the apparatus to: receive, from a session management function and/or a network exposure function, information identifying at least one of: the user equipment; a data network access identifier of the user equipment; an internet protocol address of a user plane function; and one or more traffic routing requirements, wherein the discovery request comprises the received information.

The at least one memory and at least one processor may be configured to cause the apparatus to: associate the media session with a packet data unit session based on the information identifying the user equipment.

The routing requirements may identify at least one user plane function for delivering the media session.

The at least one memory and at least one processor may be configured to cause the apparatus to: receive, from the user equipment, a media session invitation, wherein the at least one memory and at least one processor may be configured to cause the apparatus to obtain the profile information responsive to receiving the media session invitation.

The at least one memory and at least one processor may be configured to cause the apparatus to: store the obtained profile information at the apparatus.

The at least one memory and at least one processor may be configured to cause the apparatus to: send, to the network repository function, a subscription request for the profile information for the one or more gateway network functions; and receive, from the network repository function, a subscription notification comprising updated profile information for the one or more gateway network functions.

The gateway network functions may comprise: an internet protocol multimedia subsystem application gateway; or a transition gateway.

According to an aspect, there is provided an apparatus comprising at least one processor and at least one memory including a computer program code, the at least one memory and computer program code configured to, with the at least one processor, cause the apparatus at least to: store profile information for one or more gateway network functions; and provide, to a first network function, the profile information for the one or more gateway network functions.

The profile information may comprise at least one of: information identifying the one or more gateway network functions; a delay between the one or more gateway network functions and at least one user plane function; and address information for the one or more gateway network functions.

The at least one memory and at least one processor may be configured to cause the apparatus to: receive a request to store the profile information for one or more gateway network functions with which the first network function can communicate, wherein the at least one memory and at least one processor may be configured to cause the apparatus to store the profile information based on the request.

The at least one memory and at least one processor may be configured to cause the apparatus to: receive, from the first network function, a discovery request for discovering the one or more gateway network functions; and send, to the first network function and based on the discovery request, a response comprising the profile information for the one or more gateway network functions.

The discovery request may comprise information identifying at least one of: the user equipment; a data network access identifier of the user equipment; an internet protocol address of a user plane function; and one or more traffic routing requirements.

The routing requirements may identify at least one user plane function for delivering a media session to a user equipment.

The at least one memory and at least one processor may be configured to cause the apparatus to: receive, from the first network function, a subscription request for the profile information for the one or more gateway network functions; determine updated profile information for the one or more gateway network functions; and send, to the first network function, a subscription notification comprising the updated profile information for the one or more gateway network functions.

The first network function may comprise a call service control function, and the gateway network function may comprise an internet protocol multimedia subsystem application gateway; or the first network function may comprise an interconnection border control function, and the gateway network function may comprise a transition gateway.

According to an aspect, there is provided an apparatus comprising at least one processor and at least one memory including a computer program code, the at least one memory and computer program code configured to, with the at least one processor, cause the apparatus at least to: send, to a network repository function, a request to store profile information for one or more gateway network functions.

The apparatus may comprise one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided an apparatus comprising at least one processor and at least one memory including a computer program code, the at least one memory and computer program code configured to, with the at least one processor, cause the apparatus at least to: receive, from a second network function, a request to store profile information for one or more gateway network functions; and store the profile information.

The second network function may comprise one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided a method comprising: obtaining, from a network repository function, profile information for one or more gateway network functions; selecting one of the one or more gateway network functions for delivering media to a user equipment based on the profile information; and establishing a media session to deliver the media to the user equipment via the selected gateway network function.

The profile information may comprise at least one of: information identifying the one or more gateway network functions; a delay between the one or more gateway network functions and at least one user plane function; and address information for the one or more gateway network functions.

The selecting may comprise: selecting the one of the one or more gateway network functions in response to determining that the delay between the one of the one or more gateway network functions and at least one user plane function meets a quality-of-service requirement.

The method may comprise: sending, to the network repository function, a request to store the profile information for one or more gateway network functions with which the apparatus can communicate.

The obtaining may comprise: sending, to the network repository function, a discovery request for discovering the one or more gateway network functions; and receiving, from the network repository function and based on the discovery request, a response comprising the profile information for the one or more gateway network functions.

The method may comprise: receiving, from a session management function and/or a network exposure function, information identifying at least one of: the user equipment; a data network access identifier of the user equipment; an internet protocol address of a user plane function; and one or more traffic routing requirements, wherein the discovery request comprises the received information.

The method may comprise: associating the media session with a packet data unit session based on the information identifying the user equipment.

The routing requirements may identify at least one user plane function for delivering the media session.

The method may comprise: receiving, from the user equipment, a media session invitation, wherein the obtaining is performed responsive to receiving the media session invitation.

The method may comprise: storing the obtained profile information at the apparatus.

The method may comprise: sending, to the network repository function, a subscription request for the profile information for the one or more gateway network functions; and receiving, from the network repository function, a subscription notification comprising updated profile information for the one or more gateway network functions.

The gateway network functions may comprise: an internet protocol multimedia subsystem application gateway; or a transition gateway.

According to an aspect, there is provided a method comprising: storing profile information for one or more gateway network functions; and providing, to a first network function, the profile information for the one or more gateway network functions.

The profile information may comprise at least one of: information identifying the one or more gateway network functions; a delay between the one or more gateway network functions and at least one user plane function; and address information for the one or more gateway network functions.

The method may comprise: receiving a request to store the profile information for one or more gateway network functions with which the first network function can communicate, wherein the storing is performed based on the request.

The method may comprise: receiving, from the first network function, a discovery request for discovering the one or more gateway network functions; and sending, to the first network function and based on the discovery request, a response comprising the profile information for the one or more gateway network functions.

The discovery request may comprise information identifying at least one of: the user equipment; a data network access identifier of the user equipment; an internet protocol address of a user plane function; and one or more traffic routing requirements.

The routing requirements may identify at least one user plane function for delivering a media session to a user equipment.

The method may comprise: receiving, from the first network function, a subscription request for the profile information for the one or more gateway network functions; determining updated profile information for the one or more gateway network functions; and sending, to the first network function, a subscription notification comprising the updated profile information for the one or more gateway network functions.

The first network function may comprise a call service control function, and the gateway network function may comprise an internet protocol multimedia subsystem application gateway; or the first network function may comprise an interconnection border control function, and the gateway network function may comprise a transition gateway.

According to an aspect, there is provided a method comprising: sending, to a network repository function, a request to store profile information for one or more gateway network functions.

The method may be performed by one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided a method comprising: receiving, from a second network function, a request to store profile information for one or more gateway network functions; and storing the profile information.

The second network function may comprise one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided a computer readable medium comprising program instructions for causing an apparatus to perform at least the following: obtaining, from a network repository function, profile information for one or more gateway network functions; selecting one of the one or more gateway network functions for delivering media to a user equipment based on the profile information; and establishing a media session to deliver the media to the user equipment via the selected gateway network function.

The profile information may comprise at least one of: information identifying the one or more gateway network functions; a delay between the one or more gateway network functions and at least one user plane function; and address information for the one or more gateway network functions.

The selecting may comprise: selecting the one of the one or more gateway network functions in response to determining that the delay between the one of the one or more gateway network functions and at least one user plane function meets a quality-of-service requirement.

The program instructions may be for causing the apparatus to perform: sending, to the network repository function, a request to store the profile information for one or more gateway network functions with which the apparatus can communicate.

The obtaining may comprise: sending, to the network repository function, a discovery request for discovering the one or more gateway network functions; and receiving, from the network repository function and based on the discovery request, a response comprising the profile information for the one or more gateway network functions.

The program instructions may be for causing the apparatus to perform: receiving, from a session management function and/or a network exposure function, information identifying at least one of: the user equipment; a data network access identifier of the user equipment; an internet protocol address of a user plane function; and one or more traffic routing requirements, wherein the discovery request comprises the received information.

The program instructions may be for causing the apparatus to perform: associating the media session with a packet data unit session based on the information identifying the user equipment.

The routing requirements may identify at least one user plane function for delivering the media session.

The program instructions may be for causing the apparatus to perform: receiving, from the user equipment, a media session invitation, wherein the obtaining is performed responsive to receiving the media session invitation.

The program instructions may be for causing the apparatus to perform: storing the obtained profile information at the apparatus.

The program instructions may be for causing the apparatus to perform: sending, to the network repository function, a subscription request for the profile information for the one or more gateway network functions; and receiving, from the network repository function, a subscription notification comprising updated profile information for the one or more gateway network functions.

The gateway network functions may comprise: an internet protocol multimedia subsystem application gateway; or a transition gateway.

According to an aspect, there is provided a computer readable medium comprising program instructions for causing an apparatus to perform at least the following: storing profile information for one or more gateway network functions; and providing, to a first network function, the profile information for the one or more gateway network functions.

The profile information may comprise at least one of: information identifying the one or more gateway network functions; a delay between the one or more gateway network functions functions and at least one user plane function; and address information for the one or more gateway network functions.

The program instructions may be for causing the apparatus to perform: receiving a request to store the profile information for one or more gateway network functions with which the first network function can communicate, wherein the storing is performed based on the request.

The program instructions may be for causing the apparatus to perform: receiving, from the first network function, a discovery request for discovering the one or more gateway network functions; and sending, to the first network function and based on the discovery request, a response comprising the profile information for the one or more gateway network functions.

The discovery request may comprise information identifying at least one of: the user equipment; a data network access identifier of the user equipment; an internet protocol address of a user plane function; and one or more traffic routing requirements.

The routing requirements may identify at least one user plane function for delivering a media session to a user equipment.

The program instructions may be for causing the apparatus to perform: receiving, from the first network function, a subscription request for the profile information for the one or more gateway network functions; determining updated profile information for the one or more gateway network functions; and sending, to the first network function, a subscription notification comprising the updated profile information for the one or more gateway network functions.

The first network function may comprise a call service control function, and the gateway network function may comprise an internet protocol multimedia subsystem application gateway; or the first network function may comprise an interconnection border control function, and the gateway network function may comprise a transition gateway.

According to an aspect, there is provided a computer readable medium comprising program instructions for causing an apparatus to perform at least the following: sending, to a network repository function, a request to store profile information for one or more gateway network functions.

The apparatus may comprise one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided a computer readable medium comprising program instructions for causing an apparatus to perform at least the following: receiving, from a second network function, a request to store profile information for one or more gateway network functions; and storing the profile information.

The second network function may comprise one of: an internet protocol multimedia subsystem application gateway; an operations, administration and management function; and a transition gateway.

The profile information may comprise at least one of: information identifying the one or more gateway network functions; a delay between the one or more gateway network functions and at least one user plane function; and address information for the one or more gateway network functions.

According to an aspect, there is provided a non-transitory computer readable medium comprising program instructions for causing an apparatus to perform at least the method according to any of the preceding aspects.

In the above, many different embodiments have been described. It should be appreciated that further embodiments may be provided by the combination of any two or more of the embodiments described above.

DESCRIPTION OF FIGURES

Embodiments will now be described, by way of example only, with reference to the accompanying Figures in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
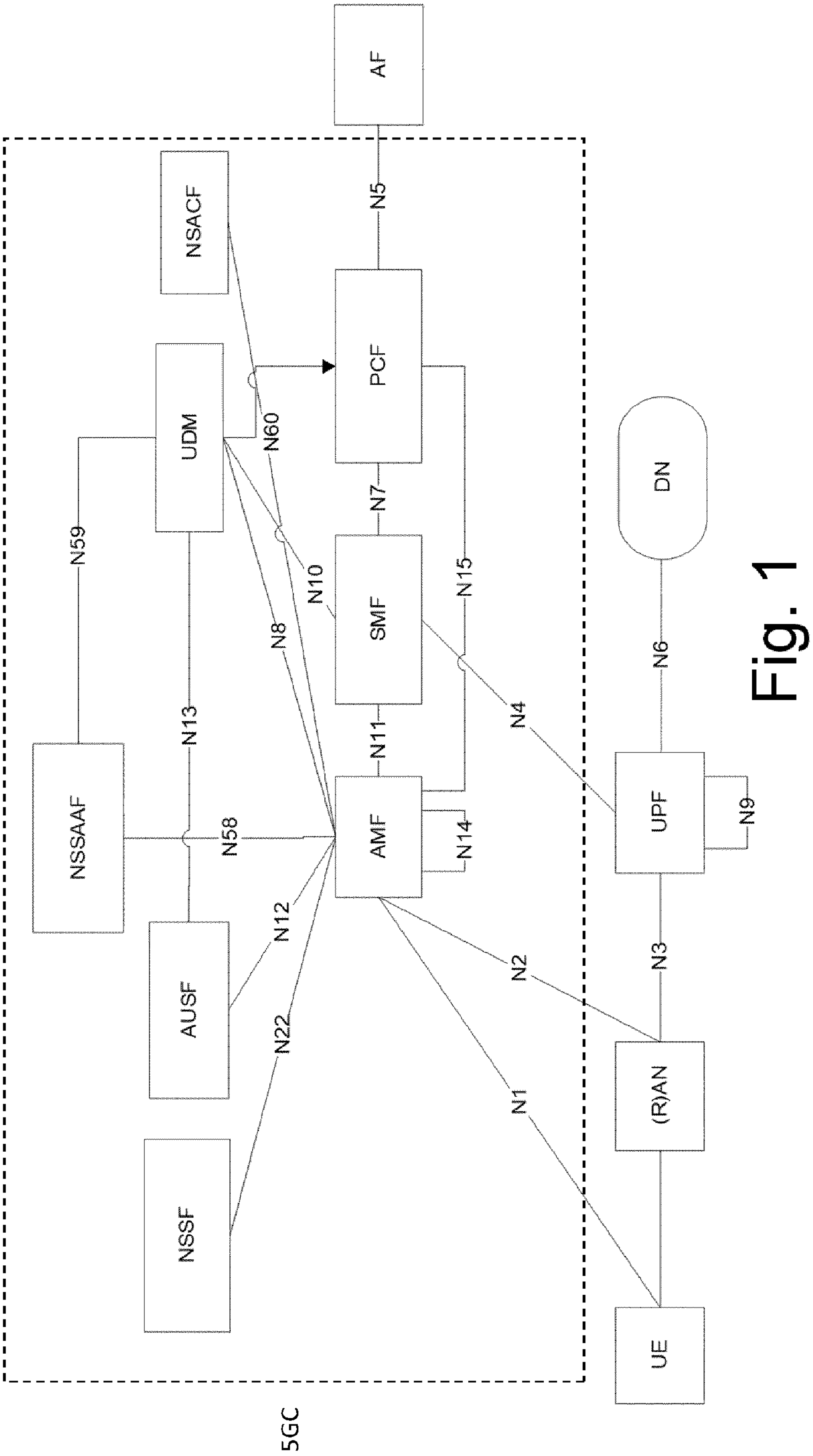
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF); one or more User Plane Functions (UPFs) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Slice Specific Authentication and Authorization Function (NSSAAF); Network Exposure Function (NEF); Network Repository Function (NRF); Policy Control Function (PCF); Unified Data Management (UDM); Network Slice Admission Control Function (NSACF); Unstructured Data Storage Function (UDSF); User Data Repository (UDR); Application Function (AF); Authentication Server Function (AUSF); an Access and Mobility Management Function (AMF); and Session Management Function (SMF).

For the sake of clarity, in FIG. 1 the UDSF, UDR, NEF and NRF have not been depicted. However, all of the network functions depicted in FIG. 1 may interact with the UDSF, UDR, NEF and NRF as necessary.

Figure 2:
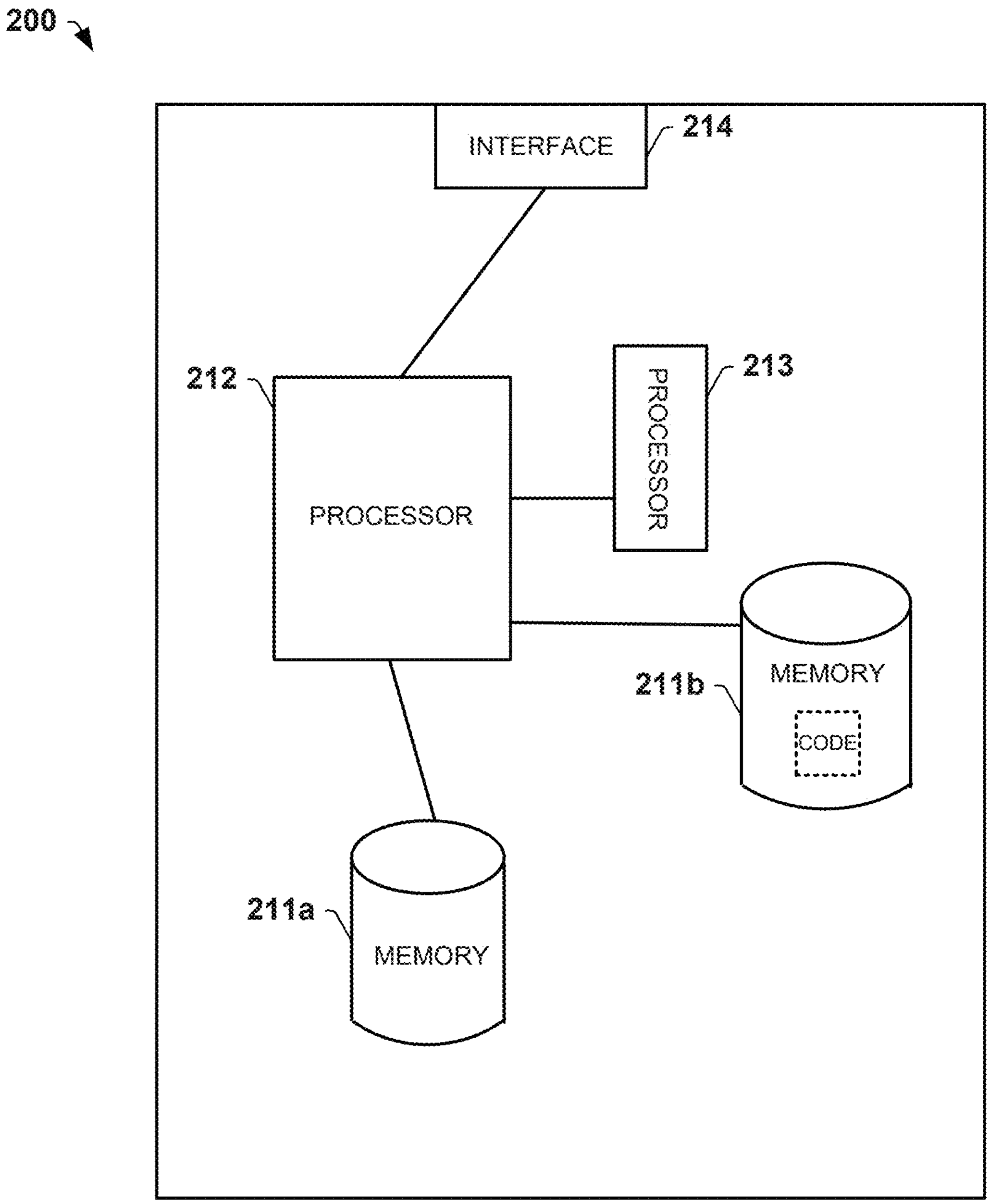
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211*a*, at least one read only memory (ROM) 211*b*, at least one processor 212, 213 and an input/output interface 214. The at least one processor 212, 213 may be coupled to the RAM 211*a* and the ROM 211*b*. The at least one processor 212, 213 may be configured to execute an appropriate software code 215. The software code 215 may for example allow to perform one or more steps to perform one or more of the present aspects. The software code 215 may be stored in the ROM 211*b*. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
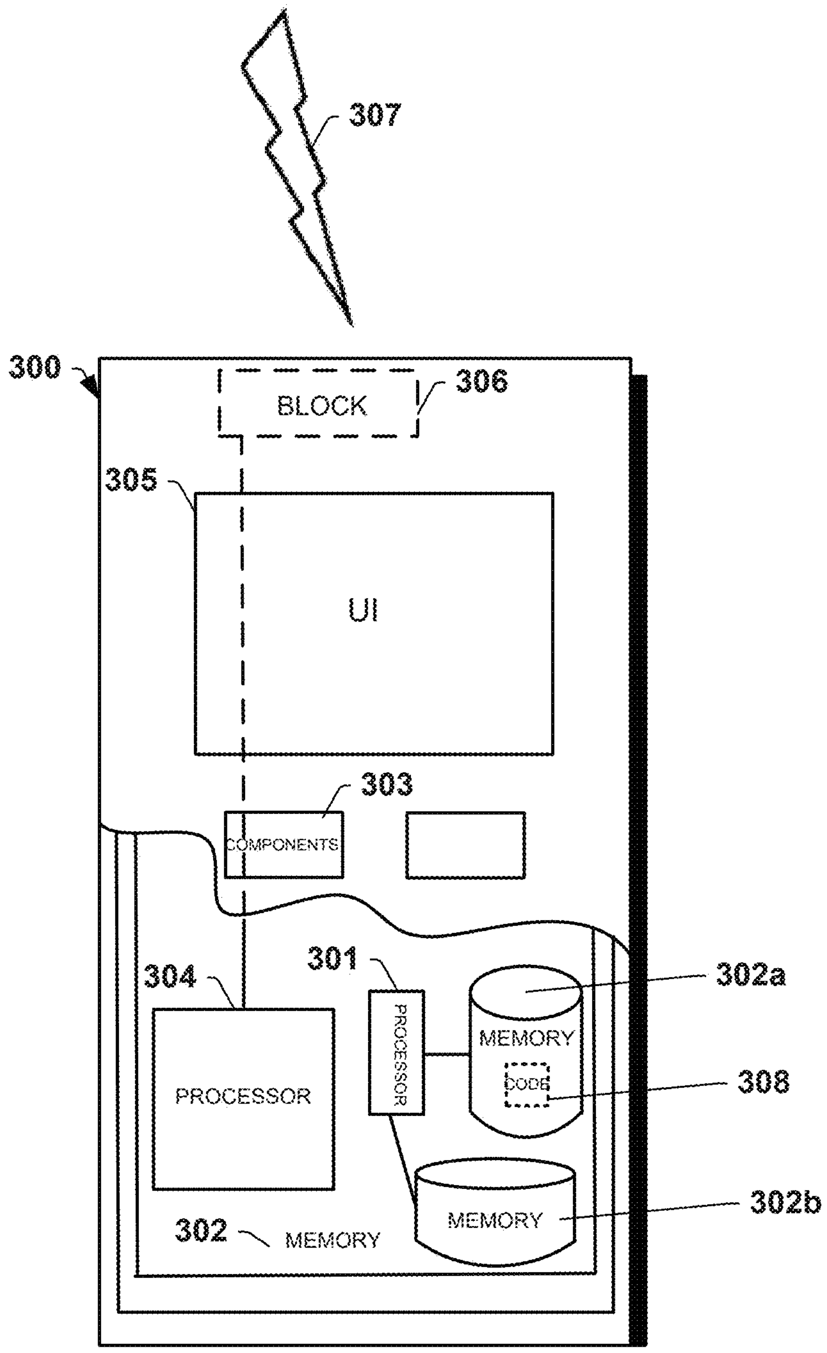
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302*a*, at least one RAM 302*b* and other possible components 303 for use in software and hardware aided execution of tasks it is designed to perform, including control of access to and communications with access systems and other communication devices. The at least one processor 301 is coupled to the RAM 302*b* and the ROM 302*a*. The at least one processor 301 may be configured to execute an appropriate software code 308. The software code 308 may for example allow to perform one or more of the present aspects. The software code 308 may be stored in the ROM 302*a*.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

The Internet Protocol (IP) Multimedia Subsystem, or IP Multimedia Core Network (CN) Subsystem (IMS) is a framework for delivering IP multimedia services in 3GPP. The IMS may comprise core network (CN) elements for provision of multimedia services. This may include the collection of signalling and media related network elements as defined in TS 23.002.

IP multimedia services may be based on a session control capability which, along with multimedia transport capabilities, may utilise an IP-Connectivity Access Network, which may include an equivalent set of services to a subset of circuit switched (CS) services.

The IMS may enable operators to offer multimedia services to one or more subscribers. The IMS may enable the convergence of, and access to, services such as voice, video, messaging, data and web-based technologies for the wireless and wireline user.

Figure 4:
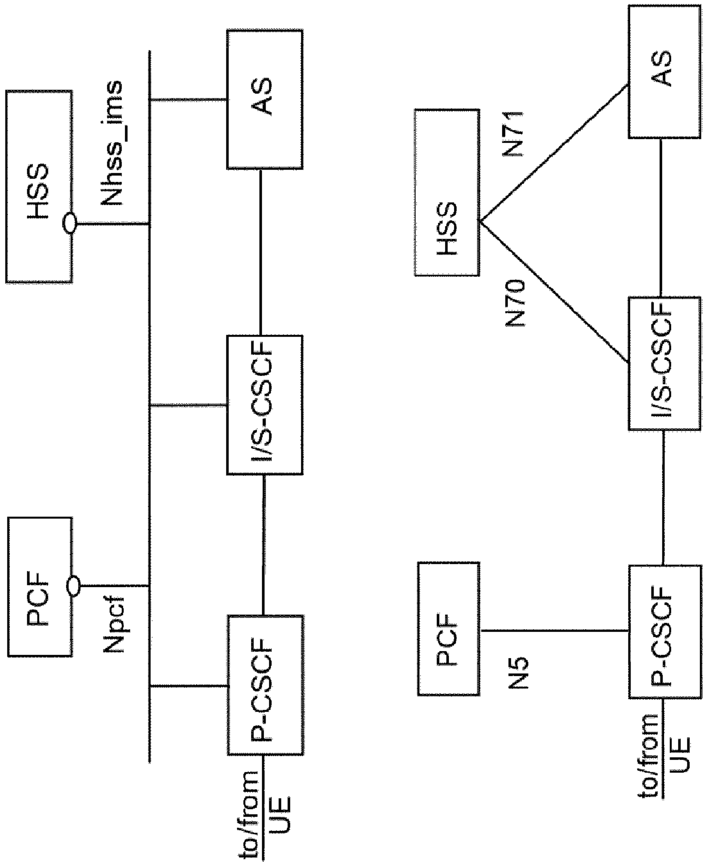
FIG. 4 show examples of system architecture to support service based architecture in IMS.

FIG. 4 show examples of system architecture to support service based architecture in IMS. In the example of FIG. 4, the application server (AS) delivers media to the UE via the interrogating/serving call service control function (I/S-CSCF) and the proxy CSCF (P-CSCF). The home subscriber server (HSS) may comprise a database of subscriber information, and may control which applications a given UE can access. The policy control function (PCF) may provide policy rules to the P-CSCF for implementing control plane functions.

Figure 7:
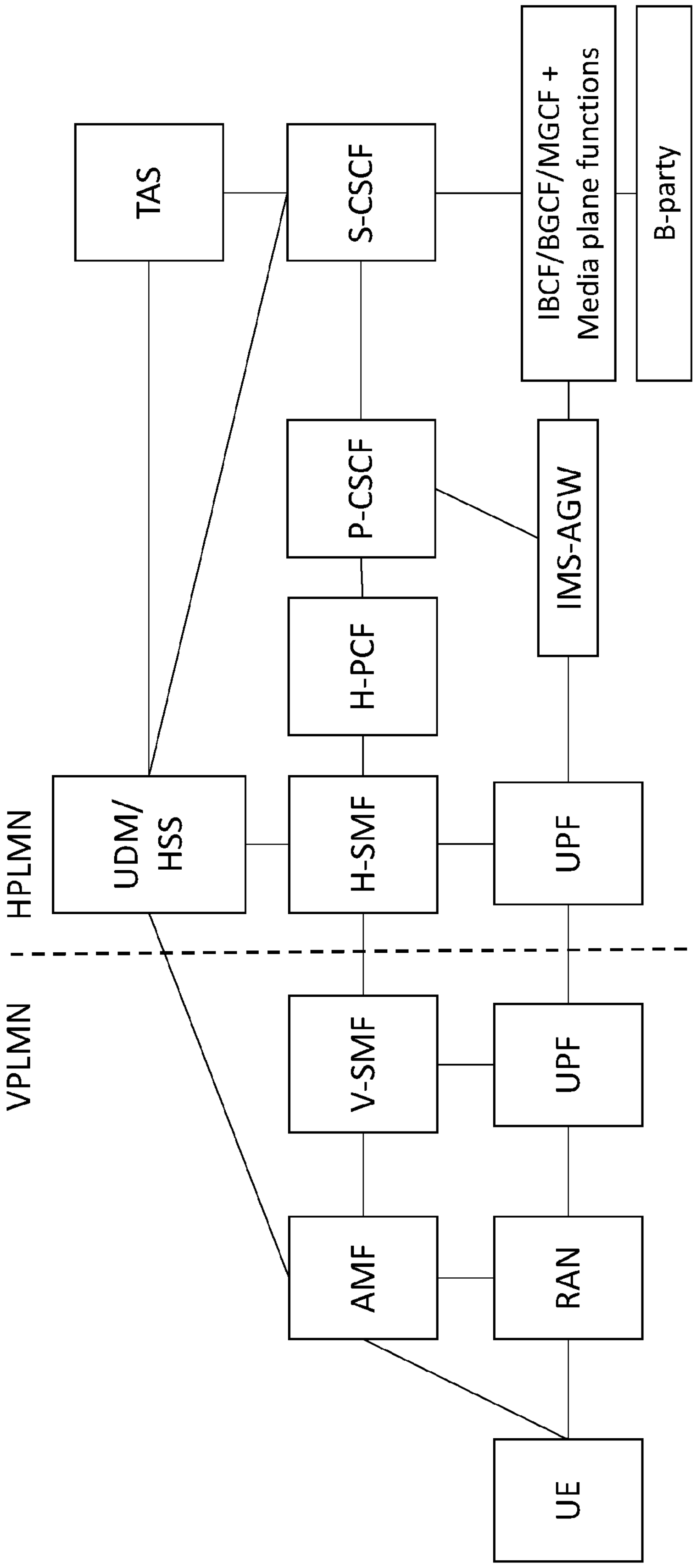
FIG. 7 shows an example system architecture according to TS 23.228.

FIG. 7 shows a further example system architecture according to TS 23.228. The system of FIG. 7 comprises a home public land mobile network (HPLMN) and a visiting public land mobile network (VPLMN).

The network comprises a radio access node (RAN), user plane function (UPF), and IMS application gateway (AGW). The IMS-AGW may be a logical entity which interfaces between an end user device (such as a UE) and the network, and may allow media from a Multimedia service to be delivered to the end user device.

The network comprises an AMF, SMF, PCF, IMS application server (AS), proxy (P) call service control function (CSCF), and a serving/interrogating (S/I) CSCF.

In the example of FIG. 7, IMS signalling is exchanged between the IMS Telephone AS (TAS) and UE via the S-CSCF, P-CSCF, UPF and RAN. IMS TAS and IMS AGW also exchange IMS signalling via S-CSCF and P-CSCF. IMS Media is delivered to the UE via the IMS AGW, UPF and RAN.

Figure 8:
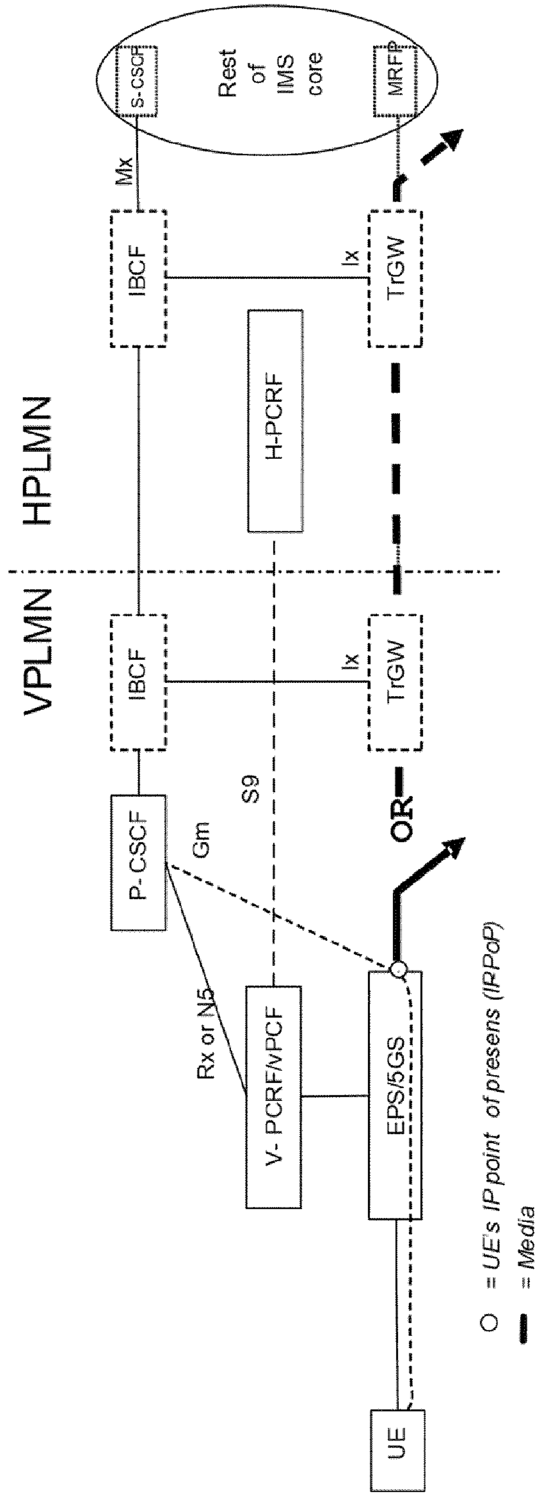
FIG. 8 shows an example architecture for delivering media to a UE.

A further example architecture for delivering media to a UE, explained in further detail in TS 23.228, is shown in FIG. 8. In the example of FIG. 8, an Interconnection Border Control Function (IBCF) may perform a similar role as the P-CSCF in the example architecture of FIG. 7, and a Transition Gateway (TrGW) may perform a similar role as the IMS-AGW in the example architecture of FIG. 7.

It should be understood that, in other examples, other system architectures and/or routing pathways may be used for delivering control plane traffic and/or media to the UE.

Figure 5:
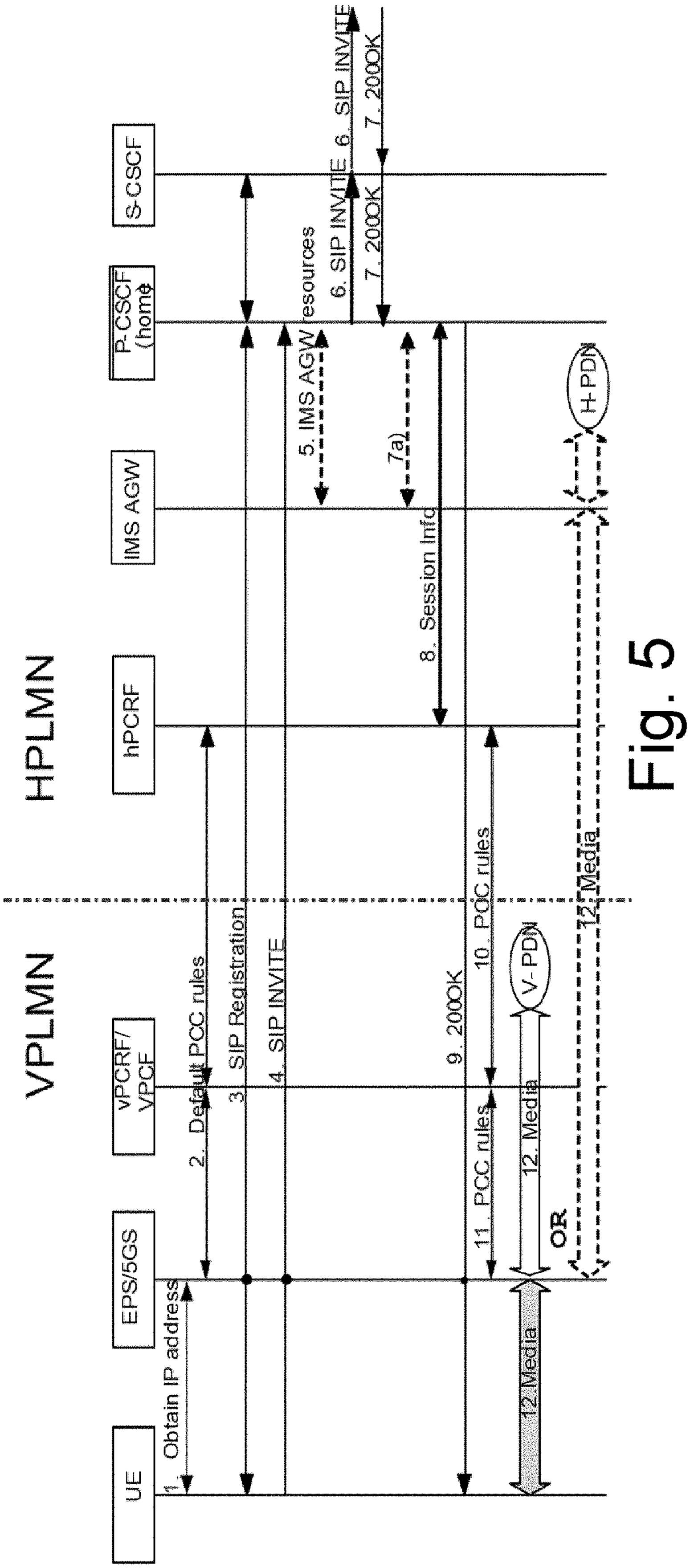
FIG. 5 shows an example information flow for establishing a media session.

FIG. 5 shows an example information flow for establishing a media session. The information flow shown in FIG. 5 may in some examples be based on the system architecture shown in FIG. 7. In the example of FIG. 5, the UE is located in a visited public land mobile network (VPLMN), while the S-CSCF, P-CSCF and IMS-AGW are located within a home public land mobile network (HPLMN).

At step 1, the UE obtains an IP address from the EPS/5GS in the visited network. This may for example be according to the IP Connectivity Access Network procedures specified by TS 23.401 or TS 23.502.

At step 2, the serving EPS/5GS (in the visited network) obtains default policy and charging control (PCC) rules and associates it with this IP connectivity access network (IP-CAN). The visited policy and charging rules function (V-PCRF/vPCF) and home policy and charging rules function (H-PCRF) may provide these rules according to TS 23.203 or TS 23.503.

At step 3, using the IP address obtained in step 1, the UE performs IMS registration. A request message, such as a SIP message, may be IP-routed by the EPS/5GS, in the visited network, to the Proxy Call Session Control Function (P-CSCF) in the home network. When the P-CSCF receives the request message, it may interact with the home policy and charging rules function (H-PCRF/vPCF) to subscribe to signalling bearer state changes.

At step 4, using the IP address obtained in step 1 in the session description protocol (SDP), the UE initiates a SIP session. An INVITE request may be routed from the EPS/5GS in the visited network, via the visited packet data network to the P-CSCF in the home network.

At step 5, the P-CSCF decides to route media to home (e.g. due to the need for address translation). The P-CSCF selects an IMS-AGW, and allocates resources in IMS-AGW and alters the offered session description protocol (SDP) accordingly. It should be understood that the P-CSCF may have other reasons to route media to the home PLMN.

At step 6, the P-CSCF sends an INVITE to the S-CSCF and onwards, for example to the TAS and back to the S-CSCG of the UE and then to the S/I-CSCF and P-CSCF of the B-Party and then finally to the B-party.

At step 7, a response message (e.g. 200 OK) is received from the far end (for example from the B-party via the P/I/S-CSCF) by the P-CSCF. If an IMS-AGW was allocated in step 5, the P-CSCF changes the SDP answer accordingly.

At step 8, the P-CSCF provides the session information to the H-PCRF/hPCRF in the home network.

At step 9, response received from the far-end at step 7 is sent by the P-CSCF through the EPS/5GS in the visited network towards the UE.

At steps 10-11, based on the IP address included in the session information, the H-PCRF in the home network provides the PCC rules to the V PCRF in the visited network when S9 is available. The V-PCRF/vPCF in the visited network provisions PCC rules in the EPS/5GS in the visited network.

At step 12, media exchanged between the UE and the far end is now routed either between the EPS/5GS in the visited network and the far end, thus achieving local breakout mode of operation; or between the EPS/5GS in the visited network via the IMS AGW in the home network if step 5 or step 7a happened.

Figure 9:
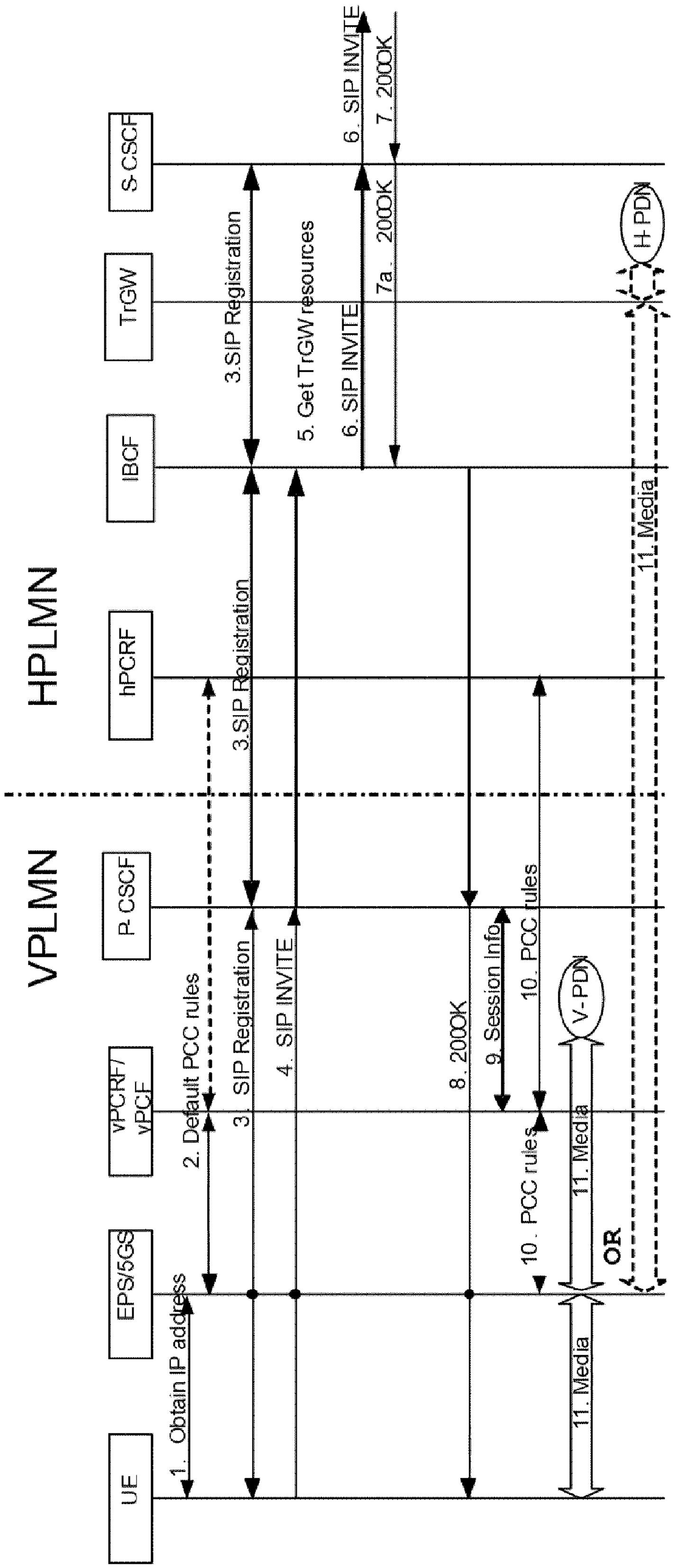
FIG. 9 shows an example information flow for establishing a media session.

FIG. 9 shows an example information flow for establishing a media session. The information flow shown in FIG. 9 may in some examples be based on the system architecture shown in FIG. 8. In the example of FIG. 9, the IBCF performs the functions of the P-CSCF, and the TrGW performs the functions of the IMS-AGW described in relation to FIG. 5.

That is to say, for example, that the IBCF may receive an INVITE request, decide to route media to home, select a TrGW, and allocate resources in the TrGW and alter the offered session description protocol (SDP) accordingly.

Figure 6:
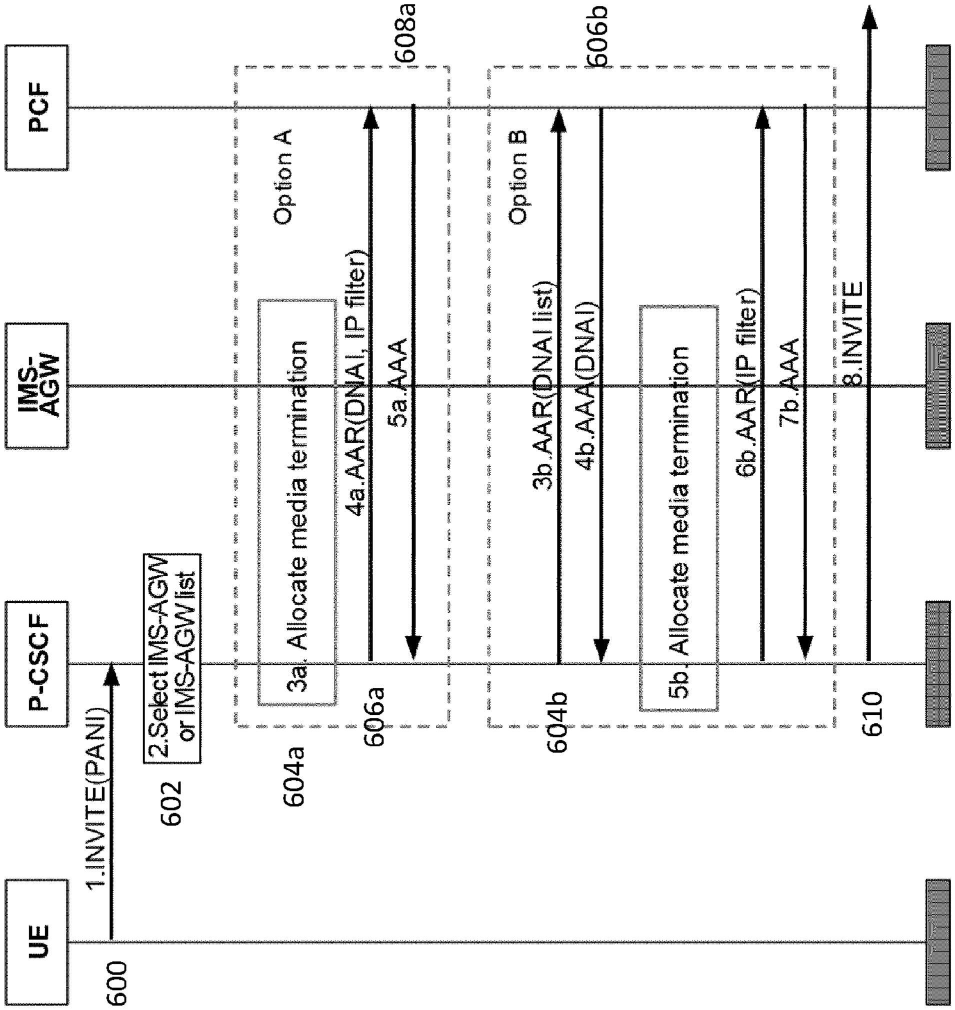
FIG. 6 shows an example information flow for establishing a media session.

FIG. 6 shows a further example information flow for establishing a media session, and in particular how a user plane path may be established according to some examples.

At step 600, the UE sends a session invite message to the P-CSCF. The session invite message may for example comprise a SIP Invite message. The session invite message may include a media feature tag and/or a user identifier (such as IMS Consumer Services Identifier (ICSI) or IMS Application Reference Identifier (IARI) to initiate an originating call.

At step 602, the P-CSCF selects an IMS-AGW or a list of IMS-AGWs according to information about the user equipment. For example, the P-CSCF may obtain information about the UE's location from the received PANI or via Rx/N5 interface from the PCF.

If at step 602 the P-CSCF selects an IMS-AGW, then at step 604*a* the P-CSCF allocates media termination between the P-CSCF and IMS-AGW. At 606*a*, the P-CSCF sends an Authorize Authenticate Request (AAR) message to the PCF. The AAR message may be used to request authentication and/or authorization for a given NAS user. A request for authorization may include the information from which the authorization will be performed, such as the User-Name, Called-Station-Id, or Calling-Station-Id AVPs. The AAR message may contain AVPs uniquely identifying the source of the call, such as Origin-Host and NAS-Port. For example, the AAR message may include a Data Network Access Identifier (DNAI) and/or IP filter information of the IMS-AGW, and optionally policies to be applied to the corresponding PDU sessions. The policies may be used by the SMF to select a UPF that is closer to the IMS-AGW. At 608*a*, the PCF responds with an Authorize Authenticate Answer (AAA) message.

If at step 602 the P-CSCF selects a list of IMS-AGWs, then at step 604*b* the P-CSCF sends an AAR message to the PCF. The AAR message comprises the DNAIs of the list of IMS-AGWs and optionally policies to be applied to the corresponding PDU sessions. The policies may be used by the SMF to select a UPF that is closer to the IMS-AGW. At 606*b*, the PCF responds with a selected IMS-AGW from among the list included in the AAR message sent at 604*b*. The P-CSCF may then allocate media termination and proceed as described previously with respect to steps 604*a*-608*a*, using the IMS-AGW indicated in the message received at step 606*b*.

Once an IMS-AGW has been selected and media termination allocated, then at step 610, the P-CSCF forwards the session invitation message to the next node, such as the S-CSCF.

Thus, in some examples, when establishing a media session in response to receiving an invitation/request from a UE, the P-CSCF may select an IMS-AGW for delivering the session. It should be understood that, in some examples, mechanisms other than those described with reference to FIGS. 5 and 6 may also be used.

In some examples the P-CSCFs in a network may register with an applicable NRF. The P-CSCF may register, in NRF, a P-CSCF profile comprising their capability information, for example using the Nnrf_NFManagement_NFRegister Request message. The profile of the P-CSCF registered in NRF may include address information, such as the IP address of the P-CSCF and may include a fully qualified domain name (FQDN) if available.

The P-CSCF may update the P-CSCF profile, including any of the previously described information, using an update request, such as the Nnrf_NFManagement_NFUpdate Request.

The SMF may discover the available P-CSCF(s) based on the information stored in the NRF and select a P-CSCF based on the information.

For example, the NRF may provide the IP address or the FQDN of P-CSCF instance(s) to the SMF. The P-CSCF selection function in the SMF may select the P-CSCF instance(s) based on the available P-CSCF instances obtained from NRF or based on configured P-CSCF information in the SMF.

If the SMF receives FQDN(s) from the NRF or is configured with FQDN(s) the SMF may resolve these to IP addresses for sending to the UE.

The following factors may be considered during the P-CSCF discovery and selection:

S-NSSAI of the PDU Session.

UE location information.

Local operator policies.

Availability of candidate P-CSCFs.

UE IP address.

Access Type.

Proximity to location of selected UPF.

Selected Data Network Name (DNN).

In some cases, the IMS may have certain quality of service (QOS) requirements for a given media session. To guarantee that a QoS requirement associated with a media session can be met, certain QoS signalling exchanges and resource allocation may be implemented according to one or more of the following:

1. Independence Between QoS Signalling and Session Control

The selection of QoS signalling and resource allocation schemes may be independent of the selected session control protocols. This may allow for independent evolution of QoS control and the session control in the IM CN subsystem.

2. Necessity for End-to-End QoS Signalling and Resource-Allocation

End-to-end QoS indication, negotiation and resource allocation during the session set-up in the IM CN subsystem may be enforced for those services and applications that require QoS better than best-effort.

3. Restricted Resource Access at the IP BS Level

Access to the resources and provisioning of QoS at IP BS Level may be authenticated and authorized by applying appropriate QoS policies via the IP Policy Control element.

4. Restricted Resource Access at the IP-Connectivity Access Network (i.e. Layer-2) Level Access to the resources and provisioning of QoS at the IP-Connectivity Access Network Level may be authenticated and authorized by using existing registration/security/QoS policy control mechanisms of the IP CAN.

5. Co-Ordination Between Session Control and QoS Signalling/Resource Allocation a. In establishing an IMS session, it may be possible for an application to request that the resources needed for bearer establishment be successfully allocated before the destination user is alerted.

b. In establishing an IMS session, it may be possible, dependent on the application being offered, to prevent the use of the bearer until the session establishment is completed.

c. In establishing an IMS session, it may be possible for a terminating application to allow the destination user to participate in determining which bearers shall be established.

d. Successful bearer establishment may include the completion of any required end-to-end QoS signalling, negotiation and resource allocation.

e. In establishing an IMS session, it may be possible to use already allocated bearer resources, if these resources fulfil the needs of the session. However, note that QoS policy control mechanisms of the IP CAN may not allow to use already allocated bearer resources.

The initiation of any required end-to-end QoS signalling, negotiation and resource allocation processes at different network segments may take place after the initiation and delivery of a session set-up request.

6. The Efficiency of QoS Signalling and Resource Allocation

The sequence of end-to-end QoS signalling, negotiation and resource allocation processes at different network segments may consider the delay in negotiating end-to-end QoS and reserving resources that contributes to the session set-up delay. Parallel or overlapping QoS negotiation and resource reservation may be allowed where possible.

7. Dynamic QoS Negotiation and Resource Allocation

Changes (upgrading or downgrading) of QoS provided to an active IMS session may be supported based on either the request from the IM application or the current network loads or link quality (e.g. radio link quality).

It may be possible to maintain a resource allocation in excess of the resources needed for current media flows (but within the restrictions imposed by points #4 and #5 above), in order to e.g. switch to different media flow characteristics without risk of admission control failure.

8. Prevention of Theft of Service

The possibility for theft of service in the IM CN subsystem may be no higher than that for the corresponding packet data and circuit switched services.

9. Prevention of Denial of Service

The system unavailability due to denial of service attacks in the IM CN subsystem may be no greater than that for the corresponding packet data and circuit switched services.

In some examples, media flows (e.g. real time transport protocol (RTP), RTP control protocol (RTCP)) used by the UE to support a single media component may be carried within the same 5GS QoS flow. In some examples, a QoS flow may be interpreted as an IP-CAN bearer. An IP-CAN session may be interpreted as a 5GS PDU session of type IP.

For delivery of some services, such as for example for Ultra Reliable Low Latency Communication (URLLC), extended reality (XR), augmented reality (AR), or virtual reality (VR) services, selection of an IMS-AGW to meet latency requirements associated with the service may be important.

That is to say, the selection of an appropriate IMS-AGW may be important in ensuring that IMS QoS requirements, such as latency requirements, can be met for delivering media services to a UE.

Figure 10:
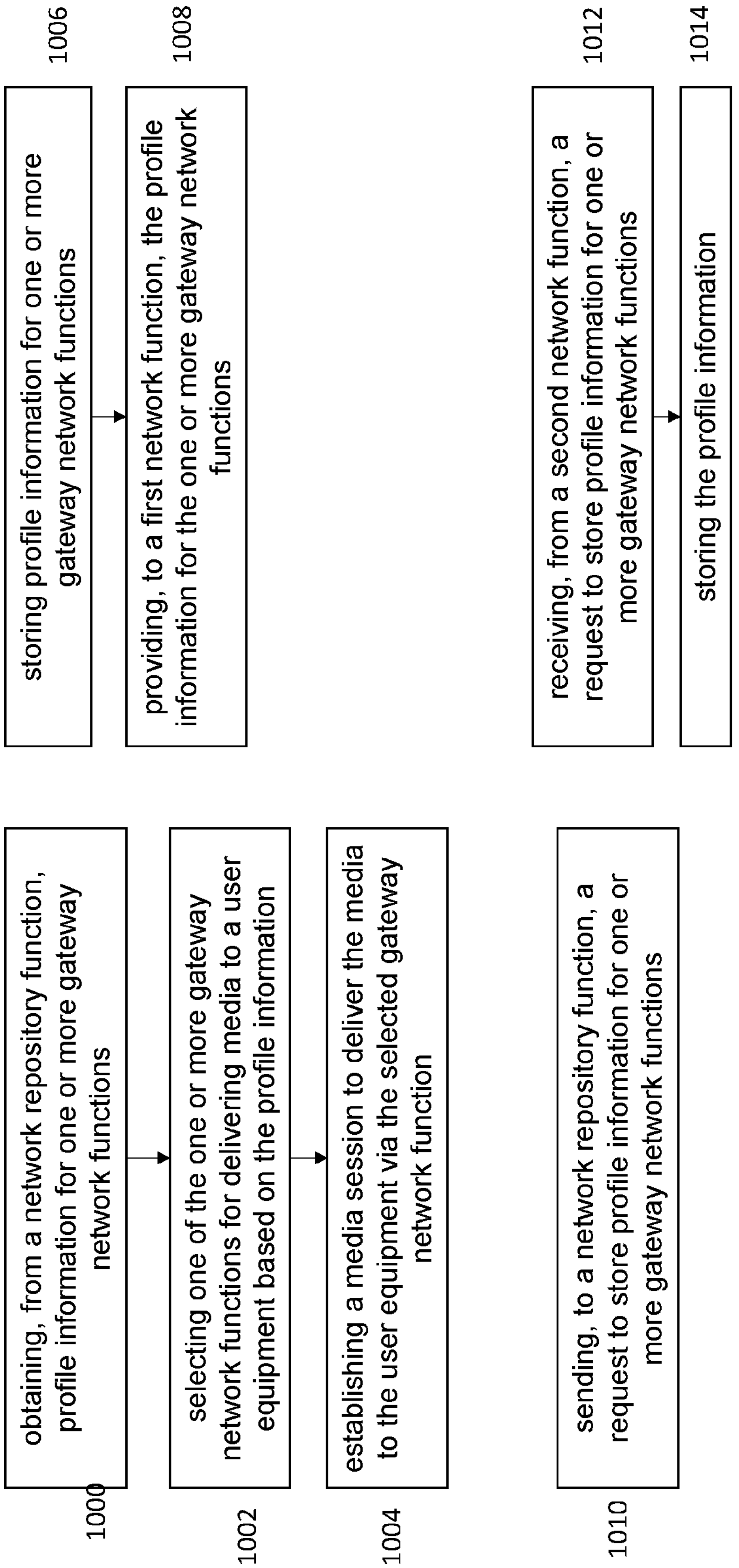
FIG. 10 shows a method according to some examples.

Reference is made to FIG. 10, which shows various methods according to some examples.

At step 1000, a method comprises obtaining, from a network repository function, profile information for one or more gateway network functions.

At step 1002, the method comprises selecting one of the one or more gateway network functions for delivering media to a user equipment based on the profile information.

At step 1004, the method comprises establishing a media session to deliver the media to the user equipment via the selected gateway network function.

At step 1006, a method comprises storing profile information for one or more gateway network functions.

At step 1008, the method comprises providing, to a first network function, the profile information for the one or more gateway network functions.

At step 1010, a method comprises sending, to a network repository function, a request to store profile information for one or more gateway network functions.

At step 1012, a method comprises receiving, from a second network function, a request to store profile information for one or more gateway network functions.

At step 1014, the method comprises storing the profile information.

In some examples, the P-CSCF may register a profile for the P-CSCF with an NRF. The P-CSCF profile may include P-CSCF capability information. The profile of the P-CSCF registered in NRF may include the IP address and may include an FQDN if available.

The registration of the P-CSCF profile may be performed by sending a request message, such as an Nnrf_NFManagement_NFRegister request message, to the NRF. The P-CSCF may update an existing profile by sending an update request, such as an Nnrf_NFManagement_NFUpdate Request, to the NRF. If the P-CSCF is taken out of service, the P-CSCF may deregister itself at the NRF by sending a deregister request, such as an Nnrf_NFManagement_NF-Deregister Request, to the NRF.

In some examples, the P-CSCF may subscribe to a status of a network entity stored at the NRF. The subscribing may cause the NRF to update the P-CSCF when the profile of the network entity stored at the NRF changes. To subscribe, the P-CSCF may send a subscription request, such as an Nnrf_NFManagement_NFStatusSubscribe message, to the NRF. To provide the information, the NRF may send a notification message, such as an Nnrf_NFManagement_NF-StatusNotify message, to the P-CSCF. To unsubscribe, the P-CSCF may send an unsubscribe such message, as an Nnrf_NFManagement_NFStatusUnsubscribe message, to the NRF.

Additionally, the P-CSCF may perform a NF Discovery procedure with the NRF. The P-CSCF may send a discovery request, such as an Nnrf_NFDiscovery message, to the NRF. The discovery message may be for discovering one or more network functions. For example, the discovery request may identify one or more network functions or network function types that the P-CSCF wants to discover. In response, the NRF may send a response message, such as an Nnrf_NF-Discovery Response message, to the P-CSCF. The response message may identify one or more network functions based on the discovery request.

In some examples, an IMS-AGW profile may be registered in the NRF. The registration may be performed by the P-CSCF or OAM on behalf of the IMS-AGW, or may be performed by the IMS-AGW itself. The registration may be performed by sending a request message, such as an Nnrf_NFManagement_NFRegister request message described previously, to the NRF. That is to say, for example, the P-CSCF, OAM, IBCF, TrGW or IMS-AGW may send, to the NRF a request to store profile information for the IMS-AGW and/or TrGW.

It should also be understood that the IMS-AGW may perform any of the update, deregister, subscribe, unsubscribe, and discovery operations with the NRF as described previously to update, deregister etc. the profile information for the IMS-AGW stored at the NRF.

Table 1 below provides a summary of some of the NRF services and services operations according to some examples:

TABLE 1

Example NRF Services and Service Operations

| Service Name | Service Operations | Operation Semantics | Example Consumer(s) |
|---|---|---|---|
| Nnrf_NFManagement | NFRegister | Request/Response | AMF, SMF, UDM, AUSF, NEF, PCF, SMSF, NSSF, UPF, BSF, CHF, NWDAF, P-CSCF, IMS-AGW, HSS, UDR, SCP, 5G DDNMF, DCCF, NSACF, MB-SMF, AF (NOTE 2) |
| | NFUpdate | Request/Response | AMF, SMF, UDM, AUSF, NEF, PCF, SMSF, NSSF, UPF, BSF, CHF, NWDAF, P-CSCF, IMS-AGW, HSS, UDR, SCP, 5G DDNMF, DCCF, NSACF, MB-SMF |
| | NFDeregister | Request/Response | AMF, SMF, UDM, AUSF, NEF, PCF, SMSF, NSSF, UPF, BSF, CHF, NWDAF, P-CSCF, IMS-AGW, HSS, UDR, SCP, 5G DDNMF, DCCF, NSACF, MB-SMF |
| | NFStatusSubscribe | Subscribe/Notify | AMF, SMF, PCF, NEF, NSSF, SMSF, AUSF, CHF, NRF, NWDAF, P-CSCF, I-CSCF, S-CSCF, IMS-AS, SCP, UDM |
| | NFStatusNotify | | AMF, SMF, PCF, NEF, NSSF, SMSF, AUSF, CHF, NWDAF, P-CSCF, I-CSCF, S-CSCF, IMS-AS, SCP, UDM |
| | NFStatusUnSubscribe | | AMF, SMF, PCF, NEF, NSSF, SMSF, AUSF, CHF, NRF, NWDAF, P-CSCF, I-CSCF, S-CSCF, IMS-AS, SCP, UDM |
| Nnrf_NFDiscovery | Request | Request/Response | AMF, SMF, PCF, NEF, NSSF, SMSF, AUSF, CHF, NRF, NWDAF, P-CSCF, I-CSCF, S-CSCF, IMS-AS, SCP, UDM, AF (NOTE 2), DCCF, MBSF, 5G DDNMF |
| Nnrf_AccessToken | Get | Request/Response | AMF, SMF, PCF, NEF, NSSF, SMSF, AUSF, UDM, NWDAF, I-CSCF, S-CSCF, IMS-AS, HSS |

Thus, the Nnrf_NFManagement service may enable one Network Function (NF) to manage its NF profile in NRF (i.e. register, update, deregister). This service may also allow a consumer NF or Service Communication Proxy (SCP) to subscribe in NRF to receive notifications regarding changes in the NF profile of other NFs.

The Nnrf_NFManagement_NFRegister service operation may register the consumer NF in the NRF by providing the NF profile of the consumer NF to NRF, and NRF marks the consumer NF available. This service operation may use one or more of the following as inputs: NF type, NF instance ID, FQDN or IP address of NF, Names of supported NF services (if applicable), and PLMN ID e.g. if NF needs to be discovered by other PLMNs. Further optional inputs may be provided.

In some examples, the consumer of the register operation, such as the Nnrf_NFManagement_NFRegister service operation, may be the P-CSCF. In such cases, the P-CSCF may provide the P-CSCF IP address(es) to be provided to the UE by SMF for storing in a profile for the P-CSCF at the NRF. In some examples, the P-CSCF may provide IP address(es) of one or more IMS-AGWs associated with the P-CSCF for storing in the profile for the P-CSCF at the NRF.

Furthermore, in some examples the consumer of the Nnrf_NFManagement_NFRegister service operation may be the IMS-AGW. In such cases, the IP address(es) of the IMS-AGW may be provided as inputs.

With respect to the discovery request, the Nnrf_NFDiscovery service may enable one NF or SCP to discover a set of one or more NF instances with specific NF service or a target NF type or one or more SCPs. The service may also enable one NF service or SCP to discover a specific NF service.

The service operations defined below may allow the NF/NF services or SCP to communicate with NRF.

The Nnrf_NFDiscovery_Request service operation may provide the IP address or FQDN of the expected NF instance (s) and, if present in NF profile, the Endpoint Address(es) of NF service instance(s) to the NF service consumer or SCP.

The discovery request may use as inputs one or more of the following: one or more target NF service Name(s), NF type of the target NF, NF type of the NF service consumer, S-NSSAI and the associated NSI ID (if available), DNN, target NF/NF service PLMN ID (or realm in the case of network specific identifier type SUCI/SUPI), NRF to be used to select NFs/services within HPLMN, Serving PLMN ID (or PLMN ID and NID in the case of SNPN), the NF service consumer ID, preferred target NF location, TAI.

If the NF service consumer needs to discover NF service producer instance(s) in an NF Set, the request may include the target NF Set ID of the producer.

In some examples, the target NF may be the P-CSCF (i.e. the NF Service consumer is requesting information relating to the P-CSCF). The request may include UE location information, UE IP address/IP prefix, Access Type.

In some examples, the target NF may be the IMS-AGW. The request may include N6 Traffic routing requirements and P-CSCF ID.

In some examples, the delay between a UPF and an application server may be determined. The UPF may be a UPF that may be used for delivering media to a UE. The delay may be a maximum or worst one-way latency between the UPF and the application server. This may not include any latency introduced by the application server itself. In some examples, where there is a chain of two or more UPFs, then the delay may be the delay between the last UPF in the chain towards the application server.

In some examples, the NRF may store the determined delay between the (last) UPF and application server in a profile for the application server stored at the NRF. In some examples, the delay for each of a plurality of UPFs may be stored at the NRF.

In some examples, the IMS-AGW may be considered an application server. That is to say, in some examples, the NRF may store the delay between one or more UPFs and IMS-AGW in an IMS-AGW profile at the NRF.

Thus, in some examples, the NRF may store profile information for one or more IMS-AGWs. The profile information may comprise information identifying the one or more IMS-AGWs, a delay between the one or more IMS-AGWs and one or more UPFs, and address information for the one or more IMS-AGWs.

In some examples, the P-CSCF may obtain a list of associated IMS-AGWs that can be reached by the respective P-CSCF. The list may comprise the profile information described previously. The P-CSCF may store the list, either locally or in the P-CSCF profile stored at the NRF.

The NRF may store and update a profile for the IMS-AGW, for example using the Nnrf_NFManagement services described previously. The P-CSCF may retrieve the IMS-AGW profile from the NRF, for example using the Nnrf_NF-Discovery_Request service operation described previously.

In some examples, the P-CSCF may subscribe to the IMS-AGW profile stored at the NRF, for example using the Nnrf_NFManagement services described previously. The NRF may determine updated profile information for an IMS-AGW and provide the updated profile information for the IMS-AGW to the P-CSCF based on the subscription.

In some examples, a UE may establish a PDU session with the network.

In some examples the P-CSCF may take of the role of the AF. The P-CSCF may additionally register/subscribe for notification for the change of UP path of the PDU Session and parameters.

Figure 11:
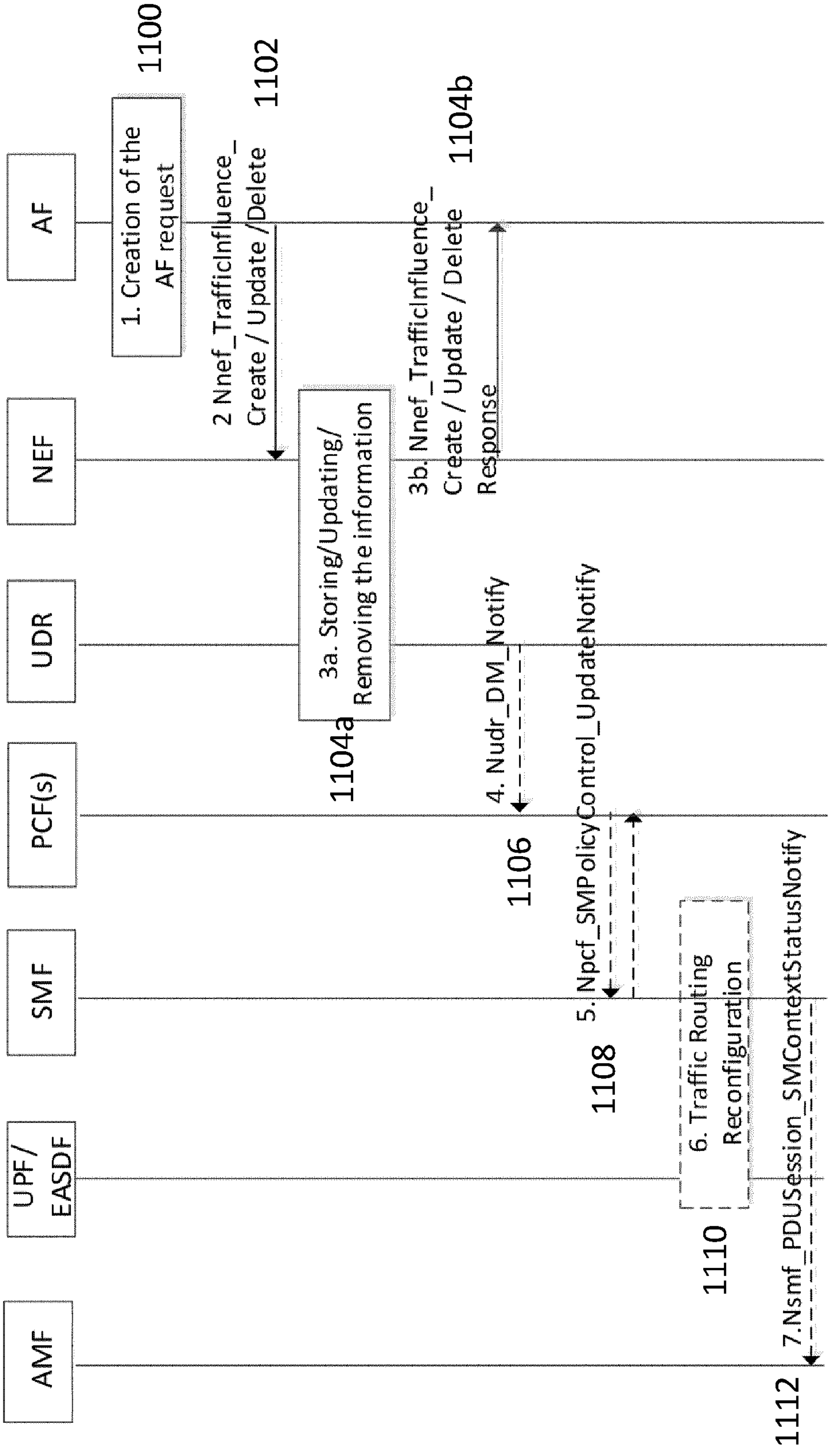
FIG. 11 shows an example AFTrafficInfluence procedure for an AF subscribing for notification of change of UP path.

An example AFTrafficInfluence procedure for an AF subscribing for notification of change of UP path is shown in FIG. 11.

At step 1100, the AF creates a new request. To create a new request, the AF may a Nnef_TrafficInfluence_Create service operation. The request may contain an AF Transaction Id. If it subscribes to events related with PDU Sessions, the AF may indicate where it desires to receive the corresponding notifications.

To update or remove an existing request, the AF may invoke a Nnef_TrafficInfluence_Update or Nnef_TrafficInfluence_Delete service operation providing the corresponding AF Transaction Id.

The Nnef_TrafficInfluence_Create (initiated by target AF) or Nnef_TrafficInfluence_Update (initiated by source AF or target AF) service operation may be used for the case of AF instance change. If Nnef_TrafficInfluence_Update service operation is invoked, the NEF may update the subscription resource. The Nnef_TrafficInfluence_Update service operation may include an updated notification target address. The updated subscription resource may be used by the target AF.

If the source AF transfers the application context to the target AF, then target AF may create new subscription via Nnef_TrafficInfluence_Create operation or update existing subscription via Nnef_TrafficInfluence_Update.

At step 1102, the AF sends its request to the NEF.

At step 1104*a*, in the case of Nnef_TrafficInfluence_Create or Update request, the NEF stores the AF request information in the UDR. In the case of Nnef_TrafficInfluence_delete request, the NEF deletes the AF requirements in the UDR.

The NEF may respond to the AF, as shown in 1104*b*.

At step 1106, the PCF(s) that have subscribed to modifications of AF requests receive a Nudr_DM_Notify notification of data change from the UDR.

At step 1108, the PCF determines if existing PDU Sessions are potentially impacted by the AF request. For each of these determined PDU Sessions, the PCF updates the SMF with corresponding new policy information about the PDU Session. For example, the PCF may invoke a Npcf_SMPolicyControl_UpdateNotify service operation.

If the AF request includes a notification reporting request for UP path change, the PCF may include in the PCC rule(s) the information required for reporting the event, including the Notification Target Address pointing to the NEF or AF and the Notification Correlation ID containing the AF Transaction Internal ID.

When the updated policy information about the PDU Session is received from the PCF, the SMF may take appropriate actions to reconfigure the User plane of the PDU Session, shown at step 1100. The SMF may consider service experience analytics and/or DN Performance analytics per UP path. Examples of actions are:

Determining a target DNAI and adding, replacing or removing a UPF in the data path to e.g. act as an UL CL or a Branching Point;

Allocate a new Prefix to the UE (when IPv6 multi-Homing applies);

Updating the UPF in the target DNAI with new traffic steering rules;

Subscribe to notifications from the AMF for an Area of Interest via Namf_EventExposure_Subscribe service operation; and Determining whether to relocate PSA UPF considering the user plane latency requirements provided by the AF.

When the updated policy information about the PDU Session related to EAS deployment information is received from the PCF, the SMF may take appropriate actions to assist the EAS discovery and re-discovery for PDU Session with Session Breakout connectivity model such as:

Retrieve the EAS deployment information; and

Providing DNS message handling rule to forward DNS messages of the UE and/or report when detecting DNS messages.

At step 1110, the SMF may decide whether it is required to send the target DNAI to the AMF for triggering SMF/I-SMF (re) selection and then inform the target DNAI information for the current PDU session or for the next PDU session to AMF. For example, the SMF may use the Nsmf_PDUSession_SMContextStatusNotify service operation.

In some examples, the content of the AF request sent at step 1102 may include any of the following information:

TABLE 2 example content of AF request

| Information Name | Description | Applicable for NEF only |
|---|---|---|
| Traffic Description | Defines the target traffic to be influenced, represented by the combination of DNN and optionally S-NSSAI, and application identifier or traffic filtering information. | The target traffic can be represented by AF-Service-Identifier, instead of combination of DNN and optionally S-NSSAI. |
| Potential Locations of Applications | Indicates potential locations of applications, represented by a list of DNAI(s). | The potential locations of applications can be represented by AF-Service-Identifier. |
| Target UE Identifier(s) | Indicates the UE(s) that the request is targeting, i.e. an individual UE, a group of UE represented by Internal Group Identifier (NOTE 3), or any UE accessing the combination of DNN, S-NSSAI and DNAI(s). | GPSI can be applied to identify the individual UE, or External Group Identifier can be applied to identify a group of UE. |
| Spatial Validity Condition | Indicates that the request applies only to the traffic of UE(s) located in the specified location, represented by areas of validity. | The specified location can be represented by a list of geographic zone identifier(s). |
| AF transaction identifier | The AF transaction identifier refers to the AF request. | N/A |
| N6 Traffic Routing requirements | Routing profile ID and/or N6 traffic routing information corresponding to each DNAI and an optional indication of traffic correlation. | N/A |
| Application Relocation Possibility | Indicates whether an application can be relocated once a location of the application is selected by the 5GC. | N/A |
| UE IP address preservation indication | Indicates UE IP address should be preserved. | N/A |
| Temporal Validity Condition | Time interval(s) or duration(s). | N/A |
| Information on AF subscription to corresponding SMF events | Indicates whether the AF subscribes to change of UP path of the PDU Session and the parameters of this subscription. | N/A |
| Information for EAS IP Replacement in 5GC | Indicates the Source EAS identifier and Target EAS identifier, (i.e. IP addresses and port numbers of the source and target EAS). | N/A |

TABLE 2-continued

| example content of AF request | | |
|---|---|---|
| Information Name | Description | Applicable for NEF only |
| User Plane Latency Requirement | Indicates the user plane latency requirements | N/A |
| Information on AF change | N/A | Indicates the AF instance relocation and relocation information. |
| Indication for EAS Relocation | Indicates the EAS relocation of the application(s) | N/A |

In some examples, the SMF may send information such as UE identifier(s), DNAI, IP address of the UPF, and Traffic Routing information to the P-CSCF. The P-CSCF may include the received information in the discovery request sent to the NRF.

On receipt of an IMS session invite message from the UE (such as a SIP INVITE message described previously with respect to step 4 of FIG. 5), the P-CSCF may correlate a core PDU session and the IMS session. This may be useful in cases where the SIP INVITE message does not carry the SDP (Session Description Protocol), and thus the SIP signalling does not have means to signal the IP address of the user plane function (as SDP is missing). For example, the P-CSCF may use the UE IP address to correlate the PDU and IMS sessions. The P-CSCF may alternatively retrieve the Traffic Routing information from a local data base.

In response to receiving the IMS session INVITE message, the P-CSCF may create a NRF discovery request. The P-CSCF may send the NRF discovery request to the NRF to query the NRF for one or more available IMS-AGWs. The NRF and/or the P-CSCF may use the routing information, DNAI and/or the IP address of the UPF to identify one or more IMS-AGWs that may be used for delivering media to the UE.

In response to receiving the NRF discovery request, the NRF may provide the profile information for one or more IMS-AGWs to the P-CSCF. The profile information may be selected by the NRF based on the routing information, DNAI and/or the IP address of the UPF. That is to say, the NRF may determine IMS-AGWs that are included in or are related to a routing path identified by the routing information, DNAI and/or the IP address of the UPF, and provide profile information for one or more IMS-AGWs that are included in or are related to that routing path.

Alternatively, if the P-CSCF has already subscribed to the IMS-AGW profile at the NRF, then the P-CSCF may already have the profile information for the one or more IMS-AGWs. That is to say, in some examples, the profile information for the one or more IMS-AGWs (and thus the determined delay for the one or more IMS-AGWs) may be locally configured on the P-CSCF.

If the P-CSCF is not already subscribed to the IMS-AGW profile at the NRF, in some examples the P-CSCF may subscribe to the IMS-AGW profile, using the methods described previously.

The P-CSCF may select an IMS-AGW based on the UE identifier(s) and Traffic Routing information received from the SMF and the profile information for the one or more IMS-AGWs received from the NRF or the locally configured information.

The P-CSCF may select the IMS-AGW to deliver the IMS session. The selection may be based on the determined delay. Thus, the P-CSCF may select an IMS-AGW in order to get the best suited IMS-AGW for the Traffic Routing requirements pointing to the related UPF.

The P-CSCF may then continue with the IMS session setup using the selected IMS-AGW.

While some of the examples above relate to the selection of an IMS-AGW by a P-CSCF, it should be understood that in other examples, an IBCF may select a TrGW using a similar procedure, where the IBCF replaces the P-CSCF and the TrGW replaces the IMS-AGW. It should be understood that other example network functions may also be implemented, and that the concepts disclosed herein are not so limited to specific network functions.

That is to say, in some examples, a first network function may select a gateway network function for delivering media to a UE. The first network function may be a P-CSCF and the gateway network function may be an IMS-AGW. Alternatively, the first network function may be an IBCF and the gateway network function may be a TrGW.

In some examples, there is provided an apparatus comprising means for obtaining, from a network repository function, profile information for one or more gateway network functions; selecting one of the one or more gateway network functions for delivering media to a user equipment based on the profile information; and establishing a media session to deliver the media to the user equipment via the selected gateway network function.

In some examples, the apparatus comprises at least one processor and at least one memory including a computer program code, the at least one memory and computer program code configured to, with the at least one processor, cause the apparatus at least to: obtain, from a network repository function, profile information for one or more gateway network functions; select one of the one or more gateway network functions for delivering media to a user equipment based on the profile information; and establish a media session to deliver the media to the user equipment via the selected gateway network function.

In some examples, there is provided an comprising means for: storing profile information for one or more gateway network functions; and providing, to a first network function, the profile information for the one or more gateway network functions.

In some examples, the apparatus comprises at least one processor and at least one memory including a computer program code, the at least one memory and computer program code configured to, with the at least one processor, cause the apparatus at least to: store profile information for one or more gateway network functions; and provide, to a first network function, the profile information for the one or more gateway network functions.

In some examples, there is provided an comprising means for: sending, to a network repository function, a request to store profile information for one or more gateway network functions.

In some examples, the apparatus comprises at least one processor and at least one memory including a computer program code, the at least one memory and computer program code configured to, with the at least one processor, cause the apparatus at least to: send, to a network repository function, a request to store profile information for one or more gateway network functions.

In some examples, there is provided an comprising means for: receiving, from a second network function, a request to store profile information for one or more gateway network functions; and storing the profile information.

In some examples, the apparatus comprises at least one processor and at least one memory including a computer program code, the at least one memory and computer program code configured to, with the at least one processor, cause the apparatus at least to: receive, from a second network function, a request to store profile information for one or more gateway network functions; and store the profile information.

It should be understood that the apparatuses may comprise or be coupled to other units or modules etc., such as radio parts or radio heads, used in or for transmission and/or reception. Although the apparatuses have been described as one entity, different modules and memory may be implemented in one or more physical or logical entities.

It is noted that whilst some embodiments have been described in relation to 5G networks, similar principles can be applied in relation to other networks and communication systems. Therefore, although certain embodiments were described above by way of example with reference to certain example architectures for wireless networks, technologies and standards, embodiments may be applied to any other suitable forms of communication systems than those illustrated and described herein.

It is also noted herein that while the above describes example embodiments, there are several variations and modifications which may be made to the disclosed solution without departing from the scope of the present invention.

In general, the various embodiments may be implemented in hardware or special purpose circuitry, software, logic or any combination thereof. Some aspects of the disclosure may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit (s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The embodiments of this disclosure may be implemented by computer software executable by a data processor of the mobile device, such as in the processor entity, or by hardware, or by a combination of software and hardware. Computer software or program, also called program product, including software routines, applets and/or macros, may be stored in any apparatus-readable data storage medium and they comprise program instructions to perform particular tasks. A computer program product may comprise one or more computer-executable components which, when the program is run, are configured to carry out embodiments. The one or more computer-executable components may be at least one software code or portions of it.

Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD. The physical media is a non-transitory media.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may comprise one or more of general purpose computers, special purpose computers, microprocessors, digital signal processors (DSPs), application specific integrated circuits (ASIC), FPGA, gate level circuits and processors based on multi core processor architecture, as non-limiting examples.

Embodiments of the disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The scope of protection sought for various embodiments of the disclosure is set out by the independent claims. The embodiments and features, if any, described in this specification that do not fall under the scope of the independent claims are to be interpreted as examples useful for understanding various embodiments of the disclosure.

The foregoing description has provided by way of non-limiting examples a full and informative description of the exemplary embodiment of this disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this invention as defined in the appended claims. Indeed, there is a further embodiment comprising a combination of one or more embodiments with any of the other embodiments previously discussed.

The invention claimed is:

1. An apparatus comprising at least one processor and at least one memory including a computer program code, the at least one memory and computer program code configured to, with the at least one processor, cause the apparatus at least to:

receive, from a user equipment, a media session invitation;

in response to receiving the media session invitation, send, to a network repository function, a discovery request for discovering one or more gateway network functions;

receive, from the network repository function and based on the discovery request, a response comprising profile information for one or more the gateway network functions one or more gateway network functions, wherein the profile information comprises a delay between the one or more gateway network functions and at least one user plane function;

select one of the one or more gateway network functions for delivering media to the user equipment based on the profile information by selecting the one of the one or more gateway network functions in response to determining that the delay between the one of the one or more gateway network functions and the at least one user plane function meets a quality-of-service requirement; and establish a media session to deliver the media to the user equipment via the selected gateway network function.

2. The apparatus of claim 1, wherein the profile information comprises:

information identifying the one or more gateway network functions;

a delay between the one or more gateway network functions and at least one user plane function; and address information for the one or more gateway network functions.

3. The apparatus of claim 1, wherein the apparatus is further caused to:

send, to the network repository function, a request to store the profile information for one or more gateway network functions with which the apparatus can communicate.

4. The apparatus of claim 1, wherein the apparatus is further caused to:

receive, from a session management function and/or a network exposure function, information identifying:

the user equipment;

a data network access identifier of the user equipment;

an internet protocol address of a user plane function; and one or more traffic routing requirements, wherein the discovery request comprises the received information.

5. The apparatus of claim 4, wherein the apparatus is further caused to:

associate the media session with a packet data unit session by correlating the packet data unit session and the media session using an internet protocol address of the user equipment.

6. The apparatus of claim 4, wherein the routing requirements identify at least one user plane function for delivering the media session.

7. The apparatus of claim 1, wherein the apparatus is further caused to:

send, to the network repository function, a subscription request for the profile information for the one or more gateway network functions; and receive, from the network repository function, a subscription notification comprising updated profile information for the one or more gateway network functions.

8. The apparatus of claim 1, wherein the delay is a maximum or worst one-way latency between the at least one user plane function and the one of the one or more gateway network functions, not including latency introduced by the gateway network function itself, and wherein the media session is for delivering at least one of: ultra reliable low latency communication services, extended reality services, augmented reality services, or virtual reality services.

9. The apparatus of claim 8, wherein, in a case where there is a chain of two or more user plane functions, the delay is the delay between a last user plane function in the chain towards the one of the one or more gateway network functions.

10. The apparatus of claim 1, wherein the apparatus comprises a proxy call service control function and the one or more gateway network functions comprise an internet protocol multimedia subsystem application gateway; or the apparatus comprises an interconnection border control function and the one or more gateway network functions comprise a transition gateway.

11. The apparatus of claim 10, wherein:

the media session invitation comprises a session initiation protocol invite message including at least one of a media feature tag or a user identifier;

the apparatus is further caused to receive, from a session management function, information comprising a user equipment identifier, a data network access identifier, an internet protocol address of a user plane function, and traffic routing requirements, and the discovery request further comprises the received information including N6 traffic routing requirements and a P-CSCF identifier;

the delay is a maximum or worst one-way latency between the at least one user plane function and the internet protocol multimedia subsystem application gateway, not including latency introduced by the application gateway itself;

the media session is for delivering at least one of ultra reliable low latency communication services, extended reality services, augmented reality services, or virtual reality services; and the apparatus is further caused to send, to a policy control function, an authorize authenticate request message comprising a data network access identifier and internet protocol filter information of the selected internet protocol multimedia subsystem application gateway.

12. The apparatus of claim 1, wherein the discovery request comprises N6 traffic routing requirements and a P-CSCF identifier.

13. The apparatus of claim 1, wherein the apparatus is further caused to:

send, to a policy control function, an authorize authenticate request message comprising a data network access identifier and/or internet protocol filter information of the selected gateway network function.

14. The apparatus of claim 1, wherein the apparatus is further caused to:

allocate media termination between the apparatus and the selected gateway network function.

15. An apparatus comprising at least one processor and at least one memory including a computer program code, the at least one memory and computer program code configured to, with the at least one processor, cause the apparatus at least to:

store profile information for one or more gateway network functions, the profile information comprising a delay between the one or more gateway network functions and at least one user plane function;

receive, from a first network function, a discovery request for discovering the one or more gateway network functions, the discovery request comprising information identifying at least one of: a user equipment, a data network access identifier of the user equipment, an internet protocol address of a user plane function, and one or more traffic routing requirements;

determine, based on the discovery request, one or more gateway network functions that are related to a routing path identified by the information in the discovery request; and provide, to the first network function and based on the discovery request, a response comprising; the profile information for the determined one or more gateway network functions.

16. The apparatus of claim 15, wherein the apparatus is further caused to:

receive a request to store the profile information for one or more gateway network functions with which the first network function can communicate, wherein the storing is performed based on the request.

17. The apparatus of claim 15, wherein the apparatus is further caused to:

receive, from the first network function, a subscription request for the profile information for the one or more gateway network functions;

determine updated profile information for the one or more gateway network functions; and send, to the first network function, a subscription notification comprising the updated profile information for the one or more gateway network functions.

18. The apparatus of claim 15, wherein:

the first network function comprises a call service control function, and the gateway network function comprises an internet protocol multimedia subsystem application gateway; or the first network function comprises an interconnection border control function, and the gateway network function comprises a transition gateway.

19. The apparatus of claim 15, wherein the profile information comprises, for each of a plurality of user plane functions, a respective delay between each of the plurality of user plane functions and the one or more gateway network functions.

20. A method comprising:

receiving, from a user equipment, a media session invitation;

in response to receiving the media session invitation, sending, to a network repository function, a discovery request for discovering one or more gateway network functions;

receiving, from the network repository function and based on the discovery request, a response comprising profile information for the one or more gateway network functions, wherein the profile information comprises a delay between the one or more gateway network functions and at least one user plane function;

selecting one of the one or more gateway network functions for delivering media to the user equipment based on the profile information by selecting the one of the one or more gateway network functions in response to determining that the delay between the one of the one or more gateway network functions and the at least one user plane function meets a quality-of-service requirement; and establishing a media session to deliver the media to the user equipment via the selected gateway network function.

* * * * *